Aug. 7, 1951  S. EPSTEIN  2,563,710
ACCOMMODATING LUG CONSTRUCTION FOR COLLAR OF ROOF VENTS
Filed Feb. 1, 1949

SAUL EPSTEIN,
INVENTOR.
HUEBNER, BEEHLER, WORREL,
HERZIG & CALDWELL,
ATTORNEYS.

Patented Aug. 7, 1951

2,563,710

UNITED STATES PATENT OFFICE 2,563,710

ACCOMMODATING LUG CONSTRUCTION FOR COLLARS OF ROOF VENTS

Saul Epstein, Los Angeles, Calif.

Application February 1, 1949, Serial No. 74,028

1 Claim. (Cl. 98—66)

This invention relates to ventilators and more particularly to a new and improved adjustable collar and a shim construction therefor.

Ventilators are ordinarily provided with collars telescopically slidable into an upstanding vent pipe and are usually retained in position on such pipe frictionally as well as gravitationally. The frictional engagement is occasioned by forming the collar with a slightly tapered and well-known crimped end portion. However, difficulty has been encountered in firm securement of the ventilator by such frictional means because of frequent wide variance in diameter of the pipe.

Many types of vent pipes are in use. Some are made of steel, others of composition including asbestos. By way of example, one type of vent pipe commonly in use in the western part of the United States and commercially known as Transite varies in the four-inch size approximately one-quarter of an inch in internal diameter.

Inasmuch as the ventilator including its integral depending collar is invariably prefabricated, the necessary resultant taper in a crimped or otherwise tapered collar is considerable so that a single line contact at the top inner edge of the upstanding vent pipe serves as a sole support for the ventilator. A strong wind may dislodge it and a sloppy fit in any event usually results. The alternative to such unsatisfactory construction involves individual fitting or special auxiliary securement of the ventilator.

In view of the above, it is an object of this invention to provide an improved collar construction having integral shims capable of extension, or even of retraction, for adapting the collar to vent pipes of varying internal diameter and which when utilized serve to positively stabilize the collar within the pipe as well as to prevent its accidental removal.

Another object of the invention is to provide a plurality of shims selectively extensible individually and collectively for varying the effective external diameter of the collar for engagement with vent pipes of varying diameters.

Another further object of the invention is the provision of a novel and improved shim construction for vent collars.

Another further object of the invention is the provision of a new and improved shim construction having the desired characteristics described which facilitates insertion of the collar in a vent pipe and resists removal thereof.

Another further object of the invention is to provide in the sheet metal collar of a ventilator an improved shim construction integral therewith whose operation is assisted by the collar body.

The invention also has among its objects the provision of improvement over prior art shim devices and reinforcing structures heretofore contemplated for generally similar purposes.

With these and other objects in view, the invention consists in the construction, arrangement and combination of the various parts of the device whereby the objects contemplated are attained, as hereinafter set forth, pointed out in the appended claim, and illustrated in the accompanying drawings.

Figure 1:
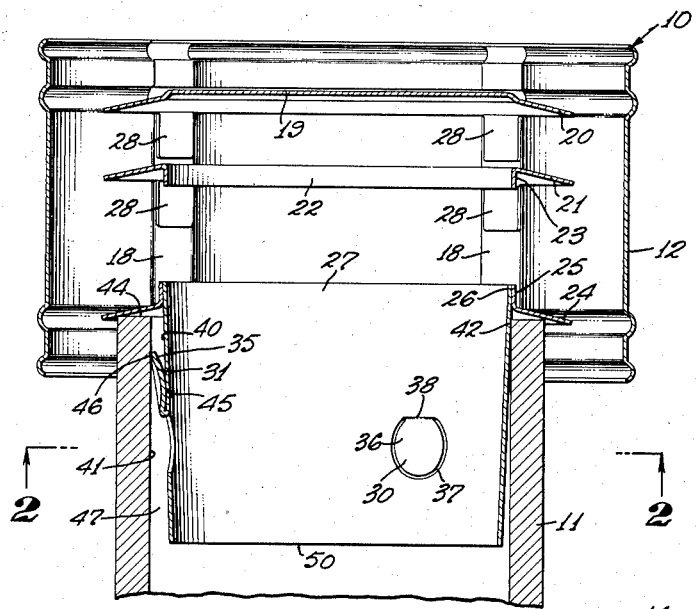
Figure 1 is a vertical sectional view of a roof ventilator embodying this invention taken as on a line 1—1 of Figure 2.

Referring more particularly to the drawings, there is illustrated a ventilator generally designated by the numeral 10 in an operative position in the top of a vent pipe 11.

The ventilator generally comprises a cowl or body portion 12 comprising a shell 13 defining vertical ventricles 14, 15, 16, and 17 as by means of preferably spot-welded connections 18 at spaced circumferential points around the body. A cap 19 formed with a baffle 20 therearound is concentric with a medial baffle 21 having a hollow center 22 and a downturned annular lip 23 around said opening. A lowermost baffle 24 concentric with the others is formed with a flange 25 by which it is secured to the upper end 26 of a collar 27.

The collar 27 may be secured to the body 12 in any suitable manner as by welding the same to said baffle 24 along any portion of the securement 18 to which the baffles 20 and 21 are also fastened at downwardly depending tabs 28.

The body 12 of the ventilator is herein selected to illustrate the invention only by way of example inasmuch as any other desired form of ventilator may be substituted for that herein shown without departing from the spirit of this invention. The instant invention relates to the particular construction of the vent collar 27 and shims 30, 31, and 32 formed therein.

The collar 27 as conventionally employed is fabricated of sheet metal or other malleable material. The shims 30, 31, and 32, as illustrated, are of substantially the shape of half a clam shell having a convex outer side 35 and a concave inner side 36. A rounded edge 37 is formed by punching out the material of the collar leaving an uncut marginal connecting portion 38. The shims may be pushed outwardly and upwardly individually, as indicated most clearly in Figure 1 (shim 31), thereby bending the connecting portion 38.

Thus, if the internal diameter of the pipe 11 is relatively small, no shim need be bent outwardly but the collar may be wedged into the top of the pipe 11 in the conventional manner. Such wedging permits engagement of the outside 40 of the collar with the inside 41 of the pipe over a relatively large area of contact 42 near the top of the pipe because of the possibility of manufacturing the instant collar with no taper or only a slight taper, the presence of the shims making it unnecessary to taper the collar adaptably to the same extent as with crimped collars of conventional construction.

Figure 3:
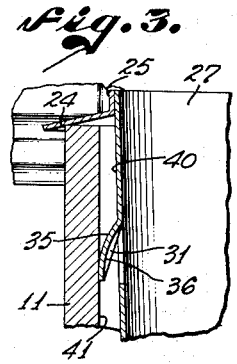
Figure 3 is an enlarged fragmentary sectional view otherwise similar to Figure 1 but showing a shim in a different position.
Figure 2:
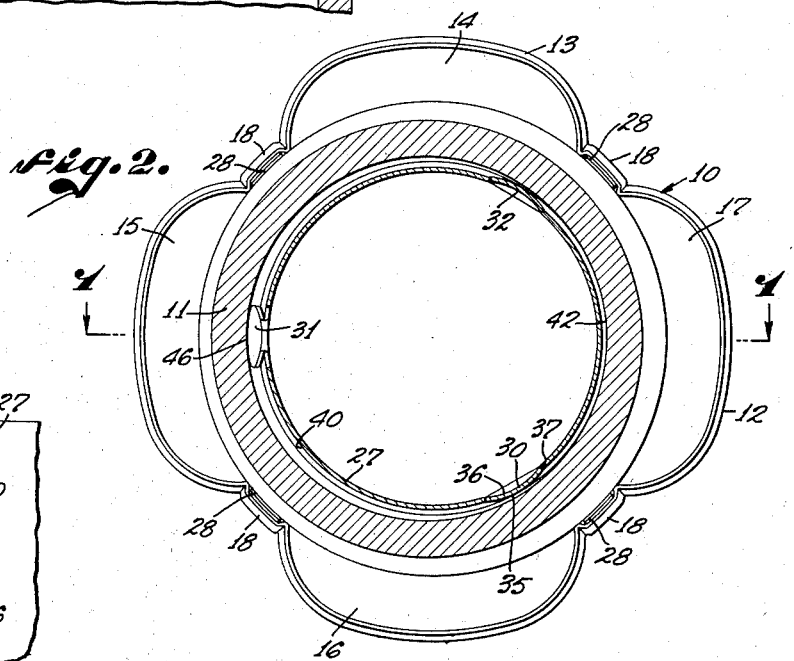
Figure 2 is a sectional view thereof taken as on a line 2—2 of Figure 1.

Even when the shims 30, 31, and 32 are not bent outwardly and upwardly in their extended position, as shown in Figure 1, the external convex surface 35 thereof can be so proportioned as to engage the inside surface 41 of the pipe at points below an upper line of circumferential contact of the collar with the upper and inner edges of the pipe, 44 and 41, respectively. In the event that the shims do not make contact with the inside of the pipe in their normal positions, cf. shims 30 and 32, they may be bent outwardly slightly to make such engagement, as shown in Figure 3. The latter type of engagement is not preferred, however.

When the shims are bent outwardly and upwardly to their fullest extent, cf. shim 31, the edge 37 of the shim is angularly disposed with respect to such surface 40 forming a tapered guide. Accordingly, insertion of the collar 27 into the upper end of the pipe 11 is facilitated and guided. Moreover, the collar 27, having a certain inherent resilience, is bowed or depressed inwardly at the point of contact 45 of the shim therewith and serves in the manner of a spring to urge the shim or shims into an outwardly extended position against the pipe. By this construction, likewise the edge 37 of the shim tends to bite into the inner surface of the pipe at the point 46 of its engagement therewith to resist removal of the ventilator substantially in the manner of a hook. Manual removal of the ventilator from the pipe is possible due to the relative hardness of the material of which the pipe is made and generally results in some scoring but not gouging of the pipe. If the pipe is made of relatively soft material, removal of the ventilator will be rendered more difficult because the shims will then dig in.

A space 47, exaggerated in the drawings, occasioned by a difference in diameter between the pipe and the collar and by the extension of one or more of the shims may occur between the collar and the pipe, but in view of the normal engagement of the baffle 24 with the top 44 of the pipe and the slightness of any needed taper of the collar, no adverse effect upon the draft is occasioned.

The clamshell-shaped or otherwise dome-shaped form of the shims gives them substantial rigidity so that a relative thin collar material is permissible without destroying the effectiveness of the shims. It is evidently possible, however, to form a substantially flat shim or ear having a fold between the hinge portion 38 and the lowermost edge thereof whereby to form a right-lined but otherwise substantially angular and thereby stiffened form in lieu thereof. Such modifications, while not preferred, would fall within the spirit of this invention. Likewise, the shims might be extensible outwardly (as in Figure 3) to hookingly engage the pipe (as in Figure 1) without doubling them back, i. e., by inverting the positions of securement of the shims and their free edges so that they need merely be bent outwardly slightly.

This invention therefore features a new and improved collar construction having an improved form of shim by which the collar may be adapted to pipes of varying internal diameter. The shims are formable at any place upon the collar, whether at or near its bottom edge 50 or adjacent the top edge 26 thereof and in any desired number. Said adjustable collar overcomes ordinary difficulties due to variations in diameter of common vent pipe material. These variations are overcome by means of an optionally slightly tapered neck and the punch-formed fold out shims. No tools are required. The worker simply punches out and up with his thumb as many shims as are necessary for the pipe in question. The grip of the shims is positive, thus assuring a permanent tight connection between the ventilator and the pipe. Perfect installations thus become a simple matter.

The term "malleable" is intended to denote a material which is bendable so as to hold its bent form without breaking. The material of which the instant collar and lug is to be made may thereby comprise aluminum, tin, iron, steel, or the like materials which are bendable, i. e., malleable within limits, and also have a certain amount of inherent resilience permitting the same to be bent upwardly and outwardly but also giving the collar a spring-like tendency to return to a circular contour when depressed inwardly by the shim.

It is also within the contemplation of this invention to utilize the instant shim construction upon a collar 27 designed to fit over and around the upper end of a vent pipe 11 so that instead of bending the shims 30, 31, and 32 outwardly and upwardly, they may be bent inwardly and upwardly. In such event, it is preferable as providing an analogous holding function to the instant construction that the concavity of the shims be reversed so that the convex portion thereof may then abut in the upwardly, inwardly bent position thereof against the inner surface of the collar and the analogous point 46 of engagement of the shim be thereby urged against the outer surface of the vent pipe 11. A baffle generally similar to that of 24 may be provided at the upper end of the collar 27 preferably inwardly directed upon such externally fitting collar. Such collar need not, as in the illustrated construction, be tapered inasmuch as the external diameter of the vent pipe is ordinarily more accurate in its various sizes than the internal diameter thereof.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claim so as to embrace any and all equivalent structures.

The invention having been herein described, what I claim as new and desire to secure by Letters Patent is:

In a roof ventilator, including a cowl body, and a substantially tubular sheet metal collar of limited resilience co-axially secured to and normally depending from the cowl body, adapted to be telescoped with the upper end of a vent pipe for supporting said ventilator thereon, the improvement comprising an enlarged convex dimple formed in a wall of said sheet metal collar, said dimple being delineated on said collar by a slit around the sides and bottom periphery of said dimple, said dimple being connected to said collar wall by a bendable constricted neck continuous with the wall of said collar, said dimple being adapted to be doubled back by means of said neck, whereby the convex surface of the dimple engages a portion of the collar wall spaced upwardly from said neck, such that the marginal periphery of the dimple lies in a plane at an acute angle relative to the axis of the collar, said dimple being adapted to slidably ride over the upper end of said vent pipe, and said wall of collar contacted by said dimpled convexity being normally flexed away from the adjacent vent pipe whereby said dimple is resiliently wedged between said collar wall and said vent pipe.

SAUL EPSTEIN.

REFERENCES CITED

The following references are of record in the file of this patent:

UNITED STATES PATENTS

| Number | Name | Date |
| --- | --- | --- |
| 809,223 | Roth | Jan. 2, 1906 |

FOREIGN PATENTS

| Number | Country | Date |
| --- | --- | --- |
| 7,762 | Great Britain | June 2, 1900 |
| 357,327 | France | Nov. 7, 1905 |
| 396,012 | Great Britain | July 27, 1933 |
| 403,049 | France | Sept. 15, 1909 |